(12) United States Patent
Wigren

(10) Patent No.: US 8,665,854 B2
(45) Date of Patent: Mar. 4, 2014

(54) METHOD AND ARRANGEMENT FOR NOISE FLOOR ESTIMATION

(75) Inventor: Torbjörn Wigren, Uppsala (SE)

(73) Assignee: Telefonaktiebolaget LM Ericsson (Publ), Stockholm (SE)

( * ) Notice: Subject to any disclaimer, the term of this patent is extended or adjusted under 35 U.S.C. 154(b) by 743 days.

(21) Appl. No.: 12/444,527

(22) PCT Filed: Oct. 6, 2006

(86) PCT No.: PCT/SE2006/050388
§ 371 (c)(1),
(2), (4) Date: Apr. 6, 2009

(87) PCT Pub. No.: WO2008/041895
PCT Pub. Date: Apr. 10, 2008

(65) Prior Publication Data
US 2010/0091753 A1     Apr. 15, 2010

(51) Int. Cl.
*H04B 7/216* (2006.01)

(52) U.S. Cl.
USPC ...... 370/342; 370/441; 455/67.13; 455/226.1

(58) Field of Classification Search
USPC ............ 370/342, 441; 455/452.1, 452.2, 442, 455/436, 453, 67.3, 424; 375/148
See application file for complete search history.

(56) References Cited

U.S. PATENT DOCUMENTS

| | | | |
|---|---|---|---|
| 2001/0055952 A1* | 12/2001 | Ficarra | 455/67.3 |
| 2003/0171123 A1* | 9/2003 | Laakso et al. | 455/453 |
| 2004/0042394 A1* | 3/2004 | Nielsen et al. | 370/218 |
| 2004/0092281 A1* | 5/2004 | Burchfiel | 455/522 |
| 2004/0162101 A1* | 8/2004 | Kim et al. | 455/522 |
| 2005/0069023 A1* | 3/2005 | Bottomley et al. | 375/148 |
| 2005/0080619 A1* | 4/2005 | Choi et al. | 704/215 |
| 2006/0103575 A1* | 5/2006 | Moeglein et al. | 342/357.15 |
| 2006/0194546 A1* | 8/2006 | Gunnarsson et al. | 455/69 |
| 2007/0014263 A1* | 1/2007 | Ferrato et al. | 370/335 |
| 2007/0155395 A1* | 7/2007 | Gopalakrishnan et al. | 455/453 |
| 2008/0063045 A1* | 3/2008 | Cozzo et al. | 375/238 |
| 2008/0254788 A1* | 10/2008 | Wigren | 455/423 |
| 2009/0088146 A1* | 4/2009 | Wigren et al. | 455/423 |
| 2009/0311968 A1* | 12/2009 | Wigren | 455/67.13 |
| 2010/0091753 A1* | 4/2010 | Wigren | 370/342 |
| 2010/0208770 A1* | 8/2010 | Wigren | 375/141 |

* cited by examiner

*Primary Examiner* — John Blanton
*Assistant Examiner* — Tito Pham

(57) ABSTRACT

A method of enabling improved soft noise power floor estimation in a code division multiple access wireless communication system, measuring (S0) samples of a received total wideband power, estimating (S1) a probability distribution for a first power quantity from the measured received total wideband power, estimating (S2) a mean power level for the first power quantity and adapting (S3) the width of the probability density function based on the estimated mean power level to enable computation of a probability density function of a noise floor measure that is a discretization on a grid.

33 Claims, 9 Drawing Sheets

METHOD AND ARRANGEMENT FOR NOISE FLOOR ESTIMATION

TECHNICAL FIELD

The present invention relates in general to methods and devices for load estimation in cellular communications systems and in particular to improved noise-floor estimation in wideband code division multiple access communication systems.

BACKGROUND

Wideband Code Division Multiple Access (WCDMA) telecommunication systems have many attractive properties that can be used for future development of telecommunication services. A specific technical challenge in e.g. WCDMA and similar systems is the scheduling of enhanced uplink channels to time intervals where the interference conditions are favorable, and where there exist a sufficient capacity in the uplink of the cell in question to support enhanced uplink channels. It is well known that existing users of the cell all contribute to the interference level in the uplink of WCDMA systems. Further, terminals in neighbor cells also contribute to the same interference level. This is because all users and common channels of a cell transmit in the same frequency band when Code Division Multiple Access (CDMA) technology is used. Consequently, the load of the cell is directly related to the interference level of the same cell.

In order to retain stability of a cell, the load needs to be kept below a certain level. Several radio resource management (RRM) algorithms such as scheduling and admission control rely on accurate estimates of the uplink load. This follows since the majority of uplink user channels, at least in WCDMA, are subject to power control. This power control and RRM algorithms aim at keeping the received power level of each channel at a certain signal to interference ratio (SIR), in order to be able to meet specific service requirements. This SIR level is normally such that the received powers in the radio base station (RBS) are several dBs below the interference level. De-spreading in so-called RAKE-receivers then enhance each channel to a signal level where the transmitted bits can be further processed, e.g. by channel decoders and speech codecs that are located later in the signal processing chain. The reader is referred to [1] for further details.

Since the RBS tries to keep each channel at its specific preferred SIR value, it may happen that an additional user, or bursty data traffic of an existing user, raises the interference level, thereby momentarily reducing the SIR for the other users. The response of the RBS is to command a power increase to all other users, something that increases the interference even more. Normally this process remains stable below a certain load level. In case a high capacity channel would suddenly appear, the raise in the interference becomes large and the risk for instability, a so-called power rush, increases. This explains why it is a necessity to schedule high capacity uplink channels. like the enhanced uplink (E-UL) channel in WCDMA, so that one can insure that instability is avoided. In order to do so, the momentary load must be estimated in the RBS. This enables the assessment of the capacity margin that is left to the instability point.

The load of a cell in e.g. a CDMA system is usually referred to some quantity related to power, typically noise rise. A number of noise rise measures do exist. The most important one is perhaps the Rise over Thermal (RoT) that is defined as the quotient of the total interference of the cell and the thermal noise power floor of the receiver of the RBS. Other measures include e.g. in-band non-WCDMA interference with respect to the thermal noise floor. Consequently, power quantities, such as total power level and noise floor (ideally thermal noise floor), have to be determined. Determinations of noise floor are typically associated with relatively large uncertainties, which even may be in the same order of magnitude as the entire available capacity margin. This is particularly true when only measurements of total received power are available. It will thus be very difficult indeed to implement e.g. enhanced uplink channel functionality without improving the load estimation connected thereto.

It could furthermore be mentioned that an equally important parameter that requires load estimation for its control, is the coverage of the cell. The coverage is normally related to a specific service that needs to operate at a specific SIR to function normally. The uplink cell boundary is then defined by a terminal that operates at maximum output power. The maximum received channel power in the RBS is defined by the maximum power of the terminal and the path loss to the digital receiver. Since the path-loss is a direct function of the distance between the terminal and the RBS, a maximum distance from the RBS results. This distance, taken in all directions from the RBS, defines the coverage.

It now follows that any increase of the interference level results in a reduced SIR that cannot be compensated for by an increased terminal power. Consequently, the path loss needs to be reduced to maintain the service. This means that the terminal needs to move closer to the RBS, i.e. the coverage of the cell is reduced.

From the above discussion, it is clear that in order to maintain the cell coverage that the operator has planned for, it is necessary to keep the interference below a specific level. This means that load estimation is important also for coverage. In particular, load estimation is important from a coverage point of view in the fast scheduling of enhanced uplink traffic in the RBS. Furthermore, the admission control and congestion control functionality in the radio network controller (RNC) that controls a number of RBSs also benefits from accurate information on the momentary noise rise of the cell.

All above mentioned noise rise measures have in common that they rely on accurate estimates of the background noise. Therefore, there is a need for methods and arrangements for providing efficient and accurate real time estimates for the background noise.

SUMMARY

A general problem with prior art CDMA communications networks is that load estimations are presented with an accuracy which makes careful load control difficult. In particular, determination of noise rise suffers from significant uncertainties, primarily caused by difficulties to estimate the noise floor.

A general object of the present invention is to provide improved methods and arrangements for determining power-related quantities, e.g. load estimation.

A further object of the present invention is to provide methods and arrangements giving opportunities for more accurate determination of noise related quantities, e.g. noise floor power estimates.

A specific object of the present invention is to provide a method enabling a soft noise floor estimation that follows a mean power level.

These and other objects are achieved in accordance with the attached set of claims.

According to a basic aspect the invention comprises a method of enabling improved soft noise power floor estimation in a code division multiple access telecommunication system, wherein a received total wideband power is measured in a first step S0, subsequently a probability function for a first power quantity is estimated S1 based on the measured received total wideband power, a mean power level for the first power quantity is estimated S2 and finally the width of the estimated probability density function is adapted S3 based on the estimated mean power level to enable subsequent computation of a probability density function of a noise floor measure that is defined on a discretization on a grid.

An advantage of the present invention comprises enabling accurate real time noise floor estimation.

BRIEF DESCRIPTION OF THE DRAWINGS

The invention, together with further objects and advantages thereof, may best be understood by referring to the following description taken together with the accompanying drawings, in which.

ABBREVIATIONS

Figure 1:
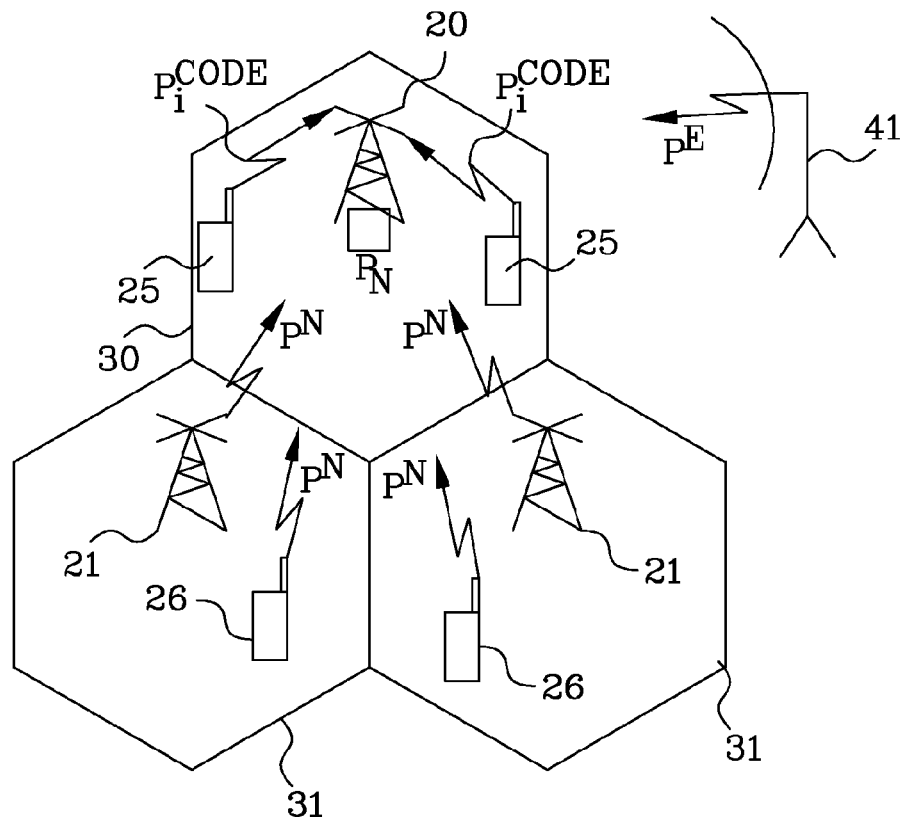
FIG. 1 is a schematic of a telecommunication system in which the present invention is applicable.

E-UL Enhanced Up Link
RBS Radio Base Station
RNC Radio Network Controller
RoT Rise over Thermal
RRM Radio Resource Management
RSSI Received Signal Strength Indication
RTWP Received Total Wideband Power
SIR Signal to Interference Ratio
WCDMA Wideband Code Division Multiple Access

DETAILED DESCRIPTION

The following detailed description is introduced by a somewhat deeper discussion about how to perform noise floor estimation and the problems encountered by a plurality of possible solutions, in order to reveal the seriousness thereof. This is done in the context of but not limited to a typical Wideband Code Division Multiple Access (WCDMA) system; the ideas of the present invention are equally applicable to many types of cellular systems where accurate noise floor power estimations are necessary but difficult to provide.

Reference and Measurement Points

In a typical signal chain of a radio base station (RBS) a received wideband signal from an antenna first passes an analogue signal conditioning chain, which consists of cables, filters etc. Variations among components together with temperature drift, render the scale factor of this part of the system to be undetermined with about 2-3 dBs, when the signal enters a receiver. This is discussed further below. In the receiver, a number of operations take place. For load estimation it is normally assumed that a total received wideband power (RTWP) is measured at some stage. Furthermore, it is assumed in this description that code power measurements, i.e. powers of each individual channel/user of the cell, are made available at another stage.

There are several reasons for the difficulties to estimate the thermal noise floor power. One reason as indicated above is that the thermal noise floor power, as well as the other received powers, is affected by component uncertainties in the analogue receiver front end. The signal reference points are, by definition, at the antenna connector. The measurements are however obtained after the analogue signal conditioning chain, in the digital receiver. These uncertainties also possess a thermal drift.

The analogue signal conditioning electronics chain does introduce a scale factor error of 2-3 dB between RBSs (batch) that is difficult to compensate for. The RTWP measurement that is divided by the default value of the thermal noise power floor may therefore be inconsistent with the assumed thermal noise power floor by 2-3 dB. The effect would be a noise rise estimate that is also wrong by 2-3 dB. Considering the fact that the allowed noise rise interval in a WCDMA system is typically 0-7 dB, an error of 2-3 dB is not acceptable.

Fortunately, all powers forming the total received power are equally affected by the scale factor error $\gamma(t)$ so when the noise rise ratio $N_R(t)$ is calculated, the scale factor error is cancelled as $$N_R(t) = N_R^{Digital\ Receiver}(t) \qquad (1)$$
$$= \frac{P^{Total, Digital\ Receiver}(t)}{P_N^{Digital\ Receiver}}$$
$$= \frac{\gamma(t) P^{Total, Antenna}(t)}{\gamma(t) P_N^{Antenna}} =$$
$$= \frac{P^{Total, Antenna}(t)}{P_N^{Antenna}}$$
$$= N_R^{Antenna}(t)$$

where $N_R^{DigitalReceiver}(t)$ and $N_R^{Antenna}(t)$ are the noise rise ratios as measured at the digital receiver and at the antenna, respectively, $P^{Total.DigitalReceiver}(t)$ and $P^{Total.Antenna}(t)$ are the total received powers at the digital receiver and the antenna, respectively, and $P_N^{DigitalReceiver}$ and $P_N^{Antenna}$ are the thermal noise level as measured at the digital receiver and the antenna, respectively. However, note that Equation (1) requires measurement of the noise floor $P_N^{DigitalReceiver}$ in the digital receiver.

Noise Floor

As indicated in the background section, the result of introducing additional channels becomes an increase in the total power. Noise rise $N_R$, defined as a ratio between a total power measure i.e. total wideband power measure, and a thermal noise level $P_N$ measured at an antenna connector, also referred to as the noise floor, is a measure of the load in the system. Above a noise rise threshold $N_R^{thr}$ the situation may become unstable. A relation between a total bit rate and a noise rise is known from the design of power control loops and scheduling of additional channels can be performed once the instantaneous noise rise $N_R$ has been determined. The pole capacity, $C_{pole}$ denotes the maximal bitrate capacity in bits per second.

A typical difference ΔN between the threshold $N_R^{thr}$ and the level defined by thermal noise level $P_N$ is typically about 7-10 dB. However, the noise floor or thermal noise level $P_N$ is not readily available. For instance, since scale factor uncertainties in the receiver may be as large as 2-3 dB as discussed above, a large part of the available margin is affected by such introduced uncertainties.

Observability of the Noise Floor

One reason for the difficulties to estimate the thermal noise floor power now appears, since even if all measurements are made in the digital receiver, the noise floor cannot be directly measured, at least not in a single RBS. The explanation is that neighbor cell interference and interference from external sources also affect the receiver, and any mean value of such sources cannot be separated from the noise floor. Power measurements in the own cell channels may in some cases be performed. Such measurements do however not solve the entire problem, although they may improve the situation somewhat.

FIG. 1 illustrates various contributions to power measurements in connection with an arbitrary radio base station (RBS) 20. The RBS 20 is associated with a cell 30. Within the cell 30 a number of mobile terminals 25 are present, which communicate with the RBS 20 over different links, each contributing to the total received power by $P_i^{Code}(t)$. The cell 30 has a number of neighboring cells 31 within the same WCDMA system, each associated with a respective RBS 21. The neighboring cells 31 also comprise mobile terminals 26. The mobile terminals 26 emit radio frequency power and the sum of all contributions is denoted by $P^N$. There may also be other network external sources of radiation, such as e.g. a radar station 41. $P^E$ denotes contributions from such external sources. Finally, the $P_N$ term arises from the receiver itself.

It is clear from the above that $P^N(t)$ and $P_N$ are not measurable and hence need to be estimated. The situation becomes even worse if only measurements of total wide band power are available. Total wide band power measurements $P_{Measurements}^{Total}(t)$ can be expressed according to:

$$P_{Measurements}^{total}(t) = \sum_{i=1}^{n} P_i^{Code}(t) + P^{E+N}(t) + P_N(t) + e^{Total}(t) \quad (2)$$

where $$P^{E+N} = P^E + P^N \quad (3)$$

and where $e^{Total}(t)$ models measurements noise.

It can be mathematically proven that a linear estimation of $P^{E+N}(t)$ and $P_N$ is not an observable entity. Only the quantity $P^{E+N}(t)+P_N$ is observable from available measurements. This is true even in the case code power measurements are performed. The problem is that there is no conventional technique that can be used to separate the noise floor from power mean values originating from neighbor cell interference and in-band interference sources external to the cellular system. Furthermore, if only measurements of total received wide band power is available, also the mean values of the individual code power contributions are indistinguishable from the other contributions to the total power mean value.

Noise Floor Estimation

Yet another reason for the difficulty with noise rise estimation is that the thermal noise floor is not always the sought quantity. There are situations where constant in-band interference significantly affects the receiver of the RBS. These constant interferers do not affect the stability discussed above; they rather appear as an increased noise temperature i.e. an increased thermal noise floor.

A possible solution is to use costly and individual determination of the thermal noise floor of each RBS in the field, in order to achieve a high enough load estimation performance. The establishment of the default value for the thermal noise power floor, as seen in the digital receiver requires reference measurements performed over a large number of RBSs either in the factory or in the field. Both alternatives are costly and need to be repeated as soon as the hardware changes.

The above approach to solve the problem would require calibration of each RBS individually. This would however be very costly and is extremely unattractive. Furthermore, temperature drift errors in the analogue signal conditioning electronics of perhaps 0.7-1.0 dB would still remain.

Another potential approach would be to provide an estimation of the thermal noise power floor. One principle for estimation of the thermal noise power floor is to estimate it as a minimum of a measured or estimated power quantity comprising the thermal noise floor. This minimum is typically computed over a pre-determined interval in time. If no code power measurements are available, the power in question is the total received wideband power. One approach would therefore be to calculate the noise rise as a division of the momentary total received wideband power with an established thermal noise floor power estimated as a minimum of the total received wideband power over a pre-determined interval of time.

It is a well known fact that the thermal noise floor contribution always is present, and consequently it can be concluded that if measurement uncertainties are neglected, the noise floor contribution has to be equal to or smaller than the minimum value of the total received wideband power received within a certain period of time. In essence, the minimum value of the total wideband power within a certain time interval constitutes an upper limit of the unknown noise floor.

A possible solution according to the above discussion could provide a hard algorithm for estimation of the thermal noise power floor, in the sense that a hard minimum value is computed over a sliding window, and used as an estimate of the thermal noise power floor. Consequently, the noise floor could be determined as the minimum value (over a selected interval of time) of either of the following:

The sum of the power of the noise floor and the power of neighbor and external interference.

The total received wideband power.

The noise rise is then subsequently calculated from one of the above two quantities, by a division of the total received wideband power with the established thermal noise floor power.

Figure 2:
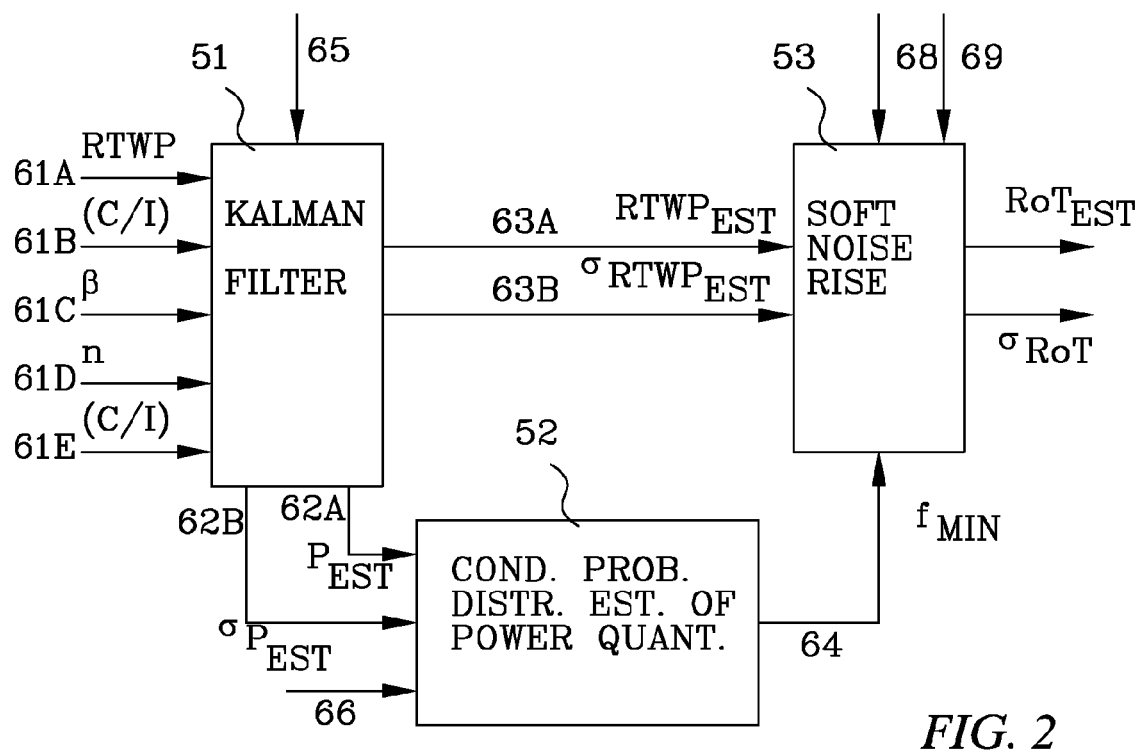
FIG. 2 is a schematic block diagram of a method in which the present invention is applicable.

With reference to FIG. 2, another possible solution provides a different principle, based on soft estimation of the thermal noise power floor and the noise rise. In the most advanced form, the possible noise rise estimation is performed in three main blocks 51, 52, 53.

The first block 51, i.e. power estimation block, applies a so called Kalman filter for estimation of certain power quantities that are needed by subsequent processing blocks. Specifically, the block 51 receives a number of inputs 61A-E comprising the measured received total wideband power (RTWP) 61A, measured code power to interference ratio (C/I) of channel i 61B, beta factors for channel i 61C, number of codes for channel i 61D. corresponding code power to interference ratio commanded by a fast power control loop 61E, and provides outputs comprising power estimates 62A, 62B and corresponding standard deviations 63A, 63B. The output 62A is the estimate of a power quantity being the sum of neighbor cell WCDMA interference power, in-band non-WCDMA interference power and thermal noise floor power, and the output 63A is the estimated received total wideband power and the output 63B is the corresponding variance. Together with the estimated means of said power quantities, the variances of said power quantities define estimated PDF:s of said power quantities (usually Gaussian in a preferred embodiment). Since the outputs are from the Kalman filter arrangement, these parameters are the only ones needed to define the estimated Gaussian distributions that are produced by the filter. Thus, enough information is given to define the entire probability distribution information of the power estimates. The scope of the present invention focuses on problems associated with this block 51.

The second block 52 applies Bayesian estimation techniques in order to compute a conditional probability density function of the minimum of one of the above mentioned power quantities. The minimum also accounts (by Bayesian methods) for the prior distribution of the thermal noise power floor, thereby improving the average performance of the estimation, when evaluated over an ensemble of RBSs. The actual value of the noise floor can also be calculated by a calculation of the mean value of the estimated conditional probability distribution function. Specifically, the block 52 receives the power estimate 62A and the corresponding standard deviations 62B as inputs, and provides an output 64 comprising the estimated probability distribution of an extreme value, typically the minimum, of $P_{Estimate}^{E+N+Noise}$, which is an estimate of the sum of neighbor cell interference power, external inband interference power and thermal noise power. Parameters 66 giving information about a prior expected probability distribution of the noise floor power is provided to the conditional probability distribution estimation block 52, in order to achieve an optimal estimation.

The third block 53 performs soft noise rise estimation by a calculation of the conditional probability distribution of the quotient of the momentary estimated wide band power probability distribution (from block 52), and the conditional probability distribution of the noise power floor. The noise rise estimate is computed as a conditional mean. The details are omitted here.

Complexity Reduced Kalman Filter

The most complicated setup of the previously described Kalman filter block 51 estimates the time variable powers of each power controlled channel of the cell, in order to allow a removal of own cell power before the noise floor power is estimated by the following block 52. The intention is that this reduction of interference, as seen by the thermal noise floor estimation step in block 52, should improve the accuracy of the overall estimator.

A problem that immediately arises is that at least one state needs to be reserved for each channel, said state modelling the momentary channel power. Since the computational complexity of a general Kalman filter varies as the number of states raised to the third power, the consequence of the above is an unacceptably high computational complexity.

An alternative variant of the Kalman filtering method reduces the computational complexity by the introduction of an approximate block structure in several steps in the Kalman filter algorithm. The end achievement is a reduction of the computational complexity to the number of states raised to the second power. This represents a substantial saving, a factor of 25 in a typical situation.

Figure 3:
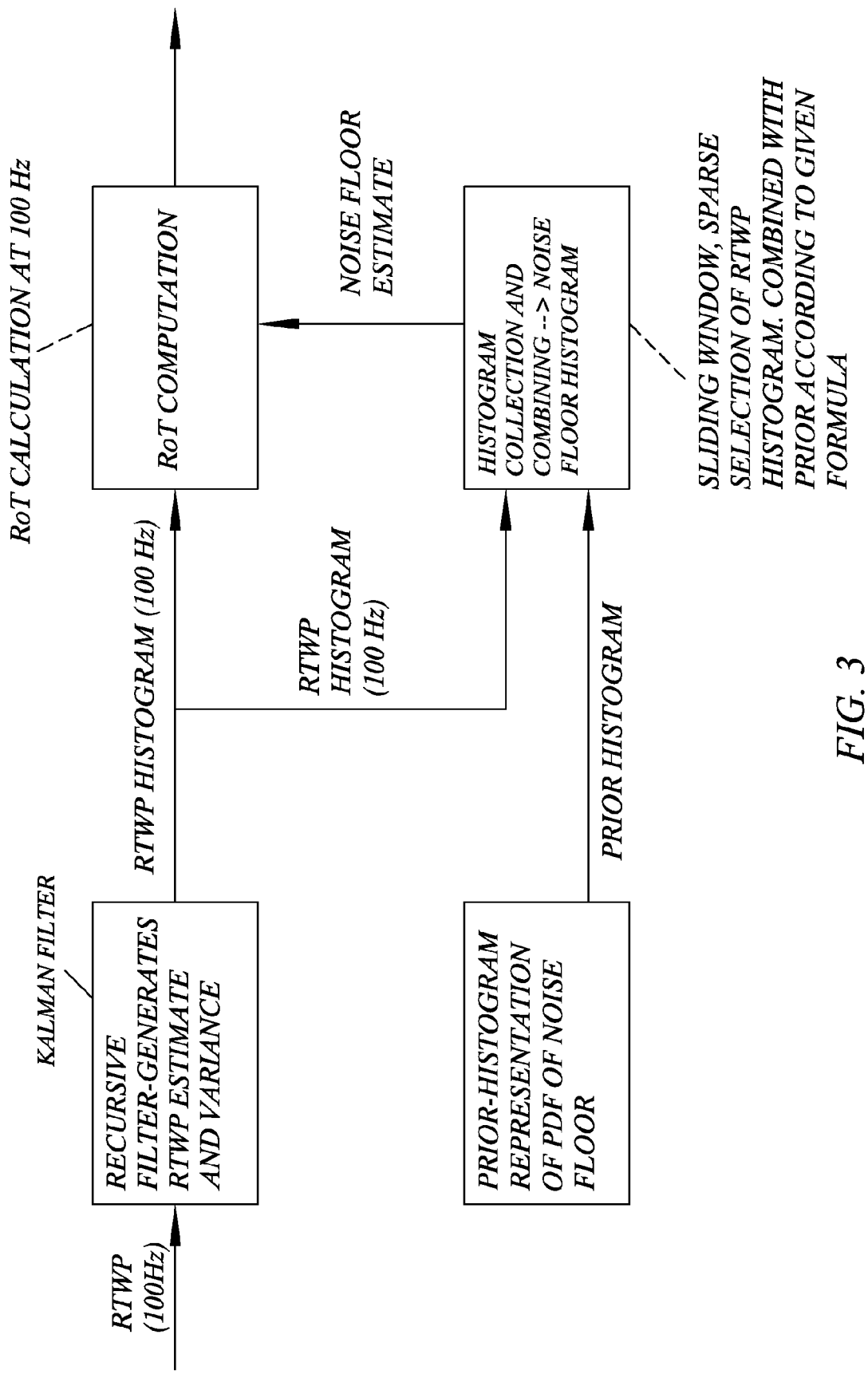
FIG. 3 is another schematic block diagram of a method in which the present invention is applicable.

In essence, with reference to FIG. 3, a modified version of the previously described possible method discloses using a simplified soft solution. Only the RTWP is measured and a simplified algorithm for RoT estimation is applied. The simplified algorithm accordingly applies a simplified, one-dimensional Kalman filter for estimation of the RTWP and the corresponding variance. The reason why this filtering step is used is that the subsequent (still soft) processing blocks require probability distributions as input. These are best generated by a Kalman filter in the first processing block, corresponding to block 51 of the previously described method.

Subsequently the thermal noise power floor is estimated with the complete soft algorithm, as described with reference to FIG. 2. Contrary to that previously described possible method, an (optimal) estimated value of the thermal noise power floor is calculated. Finally, the last processing block divides the estimated RTWP by the value of the thermal noise power floor, to obtain an estimate of the RoT. Note that this final step is not performed by a soft algorithm.

Sliding Window Solution in an Enhanced Uplink Scheduler

According to another variant in an enhanced uplink scheduler, a soft solution based on a single received wideband power (RTWP) measurement is used. Typically, the RTWP is measured and a simplified algorithm for RoT estimation is applied. The simplified algorithm described with reference to FIG. 2 accordingly:

Applies a one-dimensional Kalman filter for estimation of the RTWP and the corresponding variance. Hence, a special case of the Kalman filter block is used.

Estimates the thermal noise power floor with the complete soft algorithm, as initially described. Contrary to what is proposed an (optimal) estimated value of the thermal noise power floor is calculated.

The last processing block divides the estimated RTWP by the value of the thermal noise power floor, to obtain an estimate of the RoT. Note that this final step is not performed by a soft algorithm.

Recursive Noise Floor Estimation for RNC Admission Control

An alternative variant relating to the second block 52 depicted in FIG. 2. discloses a recursive formulation of a key equation and reduces the memory consumption of the noise floor estimation block to less than 1 percent of previous requirements. This enables the execution of 1000+ parallel instances of the soft noise rise estimation algorithm in the RNC.

Specific problems with the use of the above described previous variants of the Kalman filter in the linear domain will be described more in detail below.

First Problem—Impaired Accuracy for Misaligned Prior Noise Floor Information

Due to the use of a linear Kalman filter, as described with reference to block 52 in FIG. 2, with parameter settings in the linear domain, it follows that the estimated power quantities and the corresponding estimated covariances are the same, irrespective of the actual level of the power measurements. This is normally not a problem. However, when the dynamic range (or scaling) of the power inputs vary much, problems can arise since the covariance becomes too small or too large, as compared to the valid dynamic power levels.

The problem typically manifests itself in the second noise power floor estimation block 52 of the RoT estimator. Said second block 52 updates the probability distribution function of the minimum of several estimated probability distribution functions (PDF) of said estimated power quantities. The PDF is represented as a histogram on a discretized power range or grid, typically between −120 dBm and −70 dBm. In order to avoid an excessive number of power grid points, the power grid is logarithmically distributed.

Figure 4:
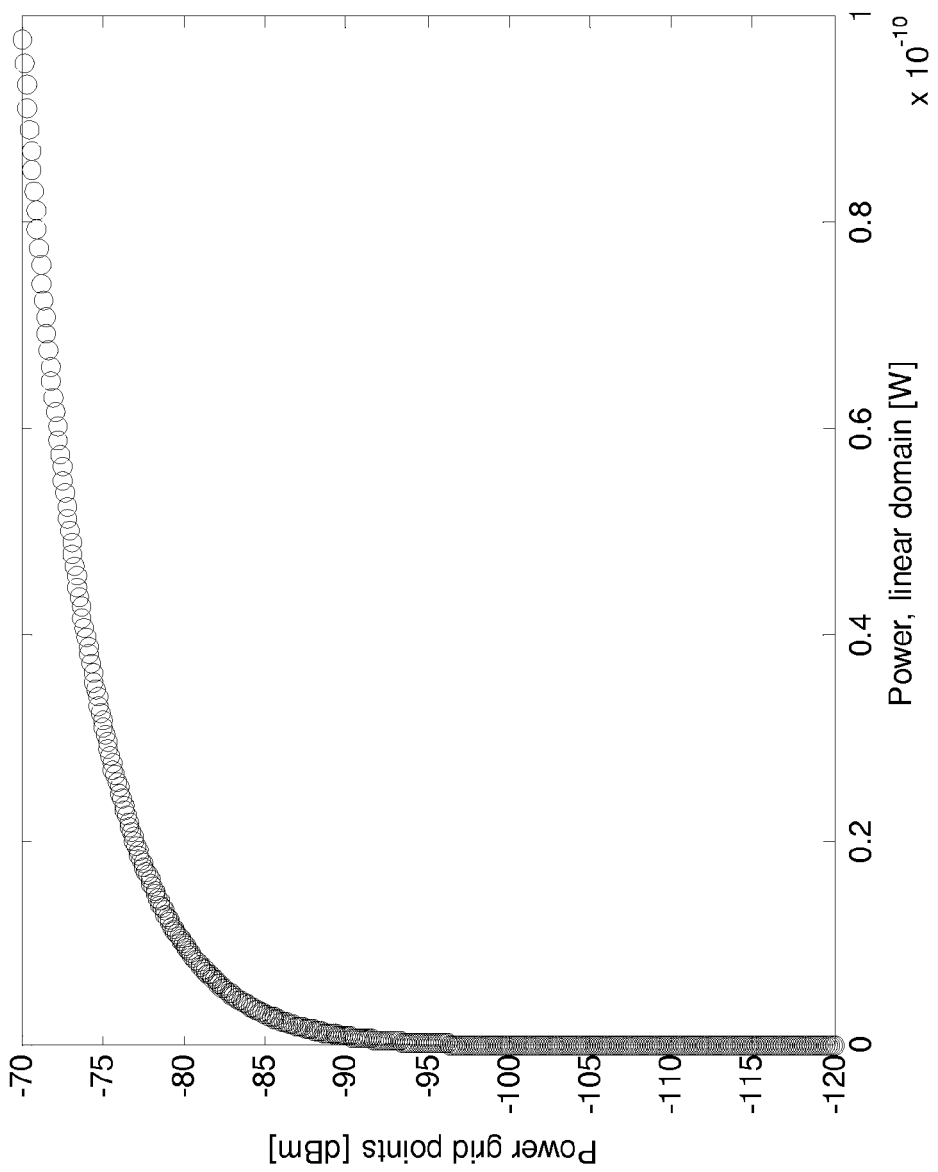
FIG. 4 is a graph of the power grid points vs. power in the linear domain.
Figure 5:
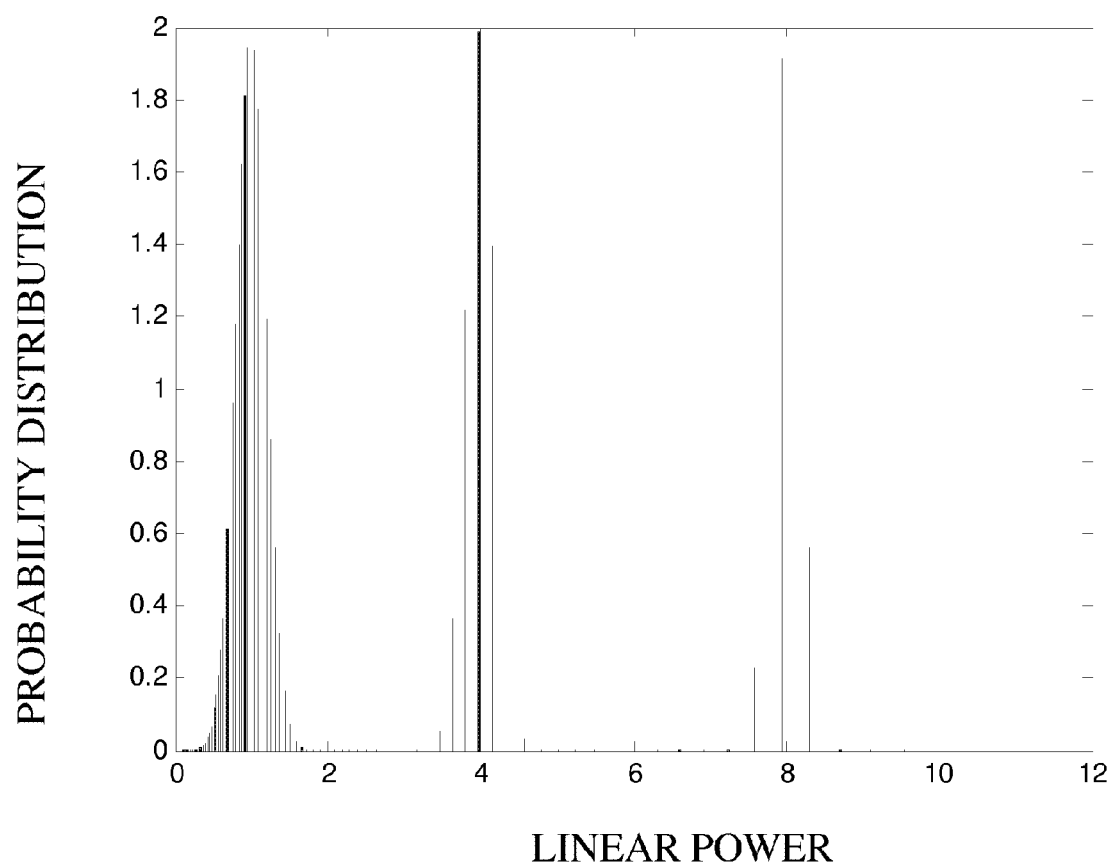
FIG. 5 is a graph of a typical discretized probability density function vs. linear power.

This means that more grid points are used for a given linear range for low power levels, than for high power levels, cf. FIG. 4. This, in turn, results in PDF:s of said estimated power quantities that cover more grid points for a given linear range for low power levels, than for high power levels. The effect of this is that the accuracy of the estimation step of block 52 becomes dependent of the power level. Since known algorithms are tuned for a nominal power level, this introduces an impairment of the estimator accuracy, with regard to the noise power floor estimate.

For high power levels the effect is the contrary in that too few power grid points are covered by the PDF:s of the power quantities, estimated by block 51. Also, this effect impairs the accuracy of the noise power floor estimator. Details on the size of the accuracy impairment will be discussed more in detail later.

Second Problem—Increased Computational Complexity for Overestimated Prior Noise Floor Information A consequence of the fact that the PDF:s of the power quantities used for computation of the PDF of the minimum of said power quantities cover more grid points when the power level is low, than when it is high, is that also the computational complexity increases when the power level is low (as compared to the level used for tuning).

This fact is undesirable, since it introduces a need for additional complexity margins in the algorithms, and also a need for specific safety nets.

Hence, it would be desirable, according to the present invention, to introduce methods that allow the widths, e.g. full width half maximum, of the PDF:s of said estimated power quantities to follow the mean measured power levels.

In order to solve the above mentioned problems, the basic idea of the present invention is to provide a suitable modification of the Kalman filter of block 51 of the RoT estimation algorithm, such that the key estimated covariance of certain estimated power quantities used by subsequent algorithmic steps, follow the measured mean power level. In particular, the covariance should be lower for power quantity levels that are lower than the nominal values used for tuning.

According to a basic embodiment of the present invention, the problem is solved by an explicit inclusion of a scaling of covariances e.g. the assumed measurement noise covariance and system noise covariance, or a pre-computed covariance. The scaling is typically the same for these two quantities. It is typically selected as the squared mean signal power level.

As will be illustrated further on in this description, the effect of this scaling step leaves the Kalman filter gain, and hence the estimated power quantities unaffected. The corresponding covariances are however scaled, with the same scale factor, thereby resulting in said desired squared mean power level tracking. This solves the problems indicated above.

Figure 6:
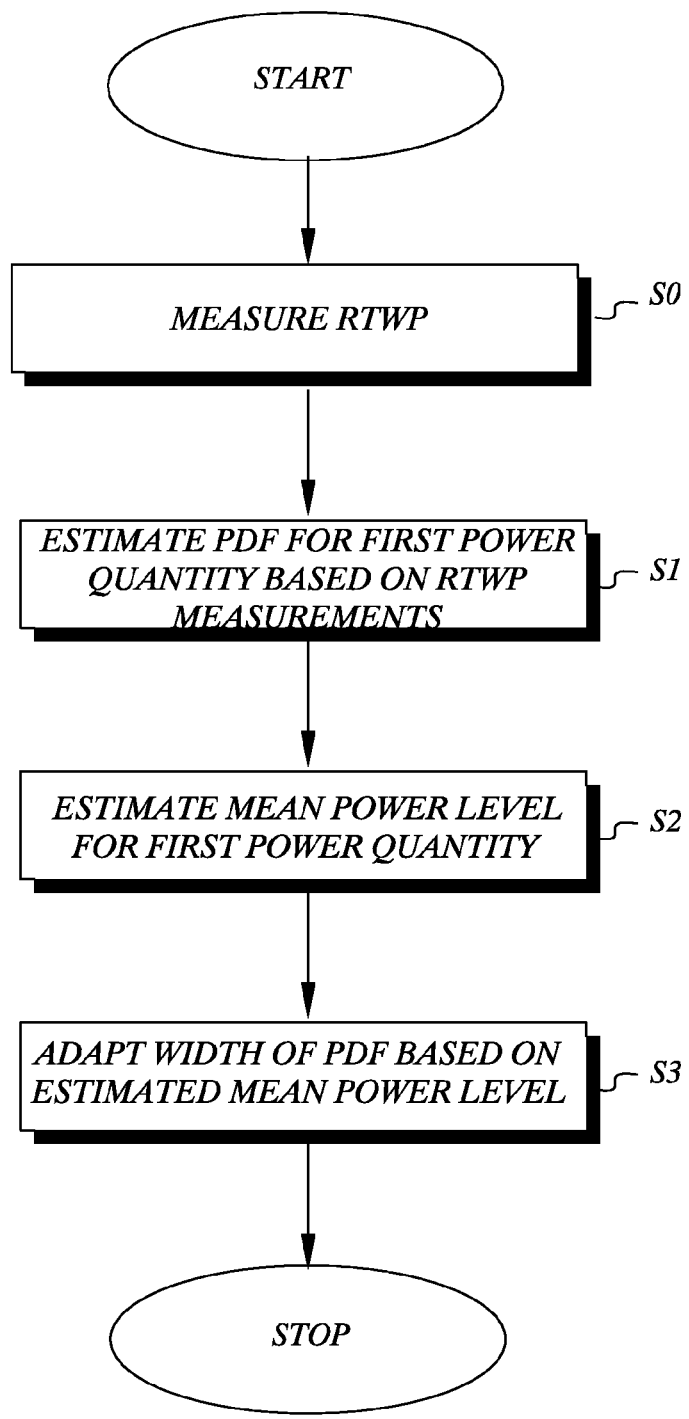
FIG. 6 is a schematic flow diagram of an embodiment of a method according to the present invention.

An embodiment of the present invention will be described with reference to FIG. 6.

Accordingly, the present invention according to a basic embodiment, comprises measuring S0 one or more samples of the received total wideband power (RTWP) and estimating S1 a probability distribution or probability density function (PDF) for at least one power quantity or power measure based on the measured RTWP. Subsequently, a mean or average power level is estimated S2 for the at least one power quantity, and finally the width of the estimated probability density is adapted S3 based on the estimated mean power level. Thereby a probability density function of a noise floor measure that is discretized on a grid is provided.

In order to get a general treatment, valid for all variants of soft RoT estimation described above as well as for future variants, a general extended Kalman filter formulation is used here. This is achieved by a treatment of a general state space model for description of the powers that affect the cell load.

General State Space Power Model

The state space model that is used to describe the powers of the cell used in the noise rise estimator is $$x(t+T)=A(t)x(t)+B(t)u(t)+w(t).$$

$$y(t)=c(x(t))+e(t) \quad (1)$$

Here $x(t)$ is a state vector consisting of various powers of relevance to a specific cell, $u(t)$ is an input vector consisting of certain power reference values and commands, $y(t)$ is an output vector consisting of the power measurements performed in the cell (e.g. the received total wideband power, RTWP), $w(t)$ is the so called systems noise that represent the model error, and $e(t)$ denotes the measurement error. The matrix $A(t)$ is the system matrix describing the dynamic modes, the matrix $B(t)$ is the input gain matrix, while the vector $c(x(t))$ is the, possibly nonlinear, measurement vector which is a function of the states of the system. Finally $t$ represents the time and $T$ represents the sampling period.

The General Extended Kalman Filter

In order to obtain a general discussion, a case with a nonlinear measurement vector is considered here. For this reason the extended Kalman filter, or variants thereof, needs to be applied, cf. [2]. This filter is given by the following matrix and vector iterations, $$C(t) = \frac{\partial c(x)}{\partial x}\bigg|_{x=\hat{x}(t|t-T)} \quad (2)$$

$$K_f(t) = P(t|t-T)C^T(t)(C(t)P(t|t-T)C^T(t) + R_2(t))^{-1}$$

$$\hat{x}(t|t) = \hat{x}(t|t-T) + K_f(t)(y(t) - C(t)\hat{x}(t|t-T))$$

$$P(t|t) = P(t|t-T) - K_f(t)C(t)P(t|t-T)$$

$$\hat{x}(t+T|t) = Ax(t|t) + Bu(t)$$

$$P(t+T|t) = AP(t|t)A^T + R_1$$

The quantities introduced by the filter iterations of Equations (2) are as follows. $\hat{x}(t|t-T)$ denotes the state prediction, based on data up to time $t-T$, $\hat{x}(t|t)$ denotes the filter update, based on data up to time $t$, $P(t|t-T)$ denotes the covariance matrix of the state prediction, based on data up to time $t-T$, and $P(t|t)$ denotes the covariance matrix of the filter update, based on data up to time $t$. $C(t)$ denotes the linearized measurement matrix (linearization around most current state prediction), $K_f(t)$ denotes the time variable Kalman gain matrix, $R_2(t)$ denotes the measurement covariance matrix, and $R_1(t)$ denotes the system noise covariance matrix. It can be noted that $R_1(t)$ and $R_2(t)$ are often used as tuning variables of the filter. In principle the bandwidth of the filter is controlled by the matrix quotient of $R_1(t)$ and $R_2(t)$.

The Key Scaling Result

The algorithmic modifications of the present invention are based on the following key results or observations by the inventor:

Result 1:

Assume that solutions $\hat{x}(t|t-T)$, $\hat{x}(t|t)$, $P(t|t-T)$ and $P(t|t)$ are computed with the iteration (2). Assume then that $R_1(t)$ and $R_2(t)$ are re-scaled according to $$R_1^\alpha(t)=\alpha^2 R_1(t) \quad (3)$$

$$R_2^\alpha(t)=\alpha^2 R_2(t), \quad (4)$$

and that the iterations are re-run with the same initialization. It then follows that the new solutions fulfill:

$$\hat{x}^{\alpha}(t|t-T) = \hat{x}(t|t-T) \quad (5)$$

$$\hat{x}^{\alpha}(t|t) = \hat{x}(t|t) \quad (6)$$

$$P^{\alpha}(t|t-T) = \alpha^2 P(t|t-T) \quad (7)$$

$$P^{\alpha}(t|t) = \alpha^2 P(t|t) \quad (8).$$

Proof:

The first Equation of (2) is clearly unaffected by the scaling, by (5). Insertion of Equation (4) and Equation (7) into the second Equation of (2) shows that also $K_f(t)$ is unaffected by the scaling since the original equation for the Kalman filter gain is obtained after simplification. This result, together with Equations (5) and (6) show that the third equation of the initially described Kalman filter still holds. In the same way it is shown that the scaling also disappears from the fourth equation of (2). The fifth equation of the original Kalman filter is obtained from Equations (4) and (5), whereas the previous result for the fourth equation of (2), together with Equations (3), (7) and (8) show that also the final original equation of (2) is obtained after simplification. This proves the result, assuming that (2) is initialized in the same way for both runs.

A few different embodiments of the present invention will be described below.

Covariance Scaling

According to a specific embodiment of the present invention and based on the discussion above, it is possible to obtain an automatic adjustment of the covariance matrix P(t|t) to one measured mean power level, by introduction of a similar scaling of $R_1(t)$ and $R_2(t)$. Here $\alpha^2$ corresponds to the mean squared power of a suitable power quantity, divided by the mean squared power of the same suitable power quantity at the nominal power level where $R_1(t)$ and $R_2(t)$ are tuned.

In this variant of the scaling algorithm according to the invention, the (extended) Kalman filter is run as usual, together with a scale factor estimation) and corresponding online correction to (2).

Output Scaling

In another specific embodiment, a simplified approach is possible. This embodiment is particularly applicable for time invariant, linear cases, in which the asymptotic Kalman filter gain $K_f(\infty)$ and the covariances $P(\infty|\infty-T)$ and $P(\infty|\infty)$ can be pre-computed, thereby reducing the computational complexity considerably. The scaling of the present invention would in such cases be directly applied to the pre-computed covariance, i.e as $$P^{\alpha}(t|t) = \alpha^2(t)P(\infty|\infty). \quad (9)$$

Note that a time variable scale factor has been introduced to stress the fact that the scale factor is normally tracked.

The scaling parameter or scaling factor $\alpha(t)$ of the present invention can be estimated or determined in different ways, an embodiment of estimating or generating a scale parameter or factor will be described in more detail below.

A typical approach would, according to a specific embodiment, be to estimate the scale factor by applying a recursive averaging filter to a suitable measured power quantity. If this is done in the linear domain, poor performance can result though. This is due to the very large dynamic range variations of up to 50 dB that may occur.

As an example consider a case where the recursive averaging filter has a time constant corresponding to 1000 power samples. In case the filter has settled at a low power level, a sudden increase of the power level with e.g. 30 dB means that the latest power sample would dominate over the state of the filter, causing convergence to the new level 30 dB above the lower level within a few power samples.

On the contrary, in case the filter would experience a power level drop of 30 dBs, it would take about 1000 samples before the filter state has dropped to 37% of its initial value. The time required to reach a level 30 dBs below the original level far exceeds 1000 samples.

Hence the conclusion is that when large changes in level occurs, averaging in the linear domain causes the response of the averaging filter to be un-symmetric on rising and falling edges of the power level.

A remedy for the above situation is to perform the averaging of the present invention in the logarithmic domain, i.e. apply the recursive averaging filter to values expressed in dBW or dBm.

An embodiment of the complete scale factor adaptation according to the invention can then be expressed as follows, for a simple first order recursive case:

$$x_{log}(t) = 10\log^{10}(x(t)) \quad (10)$$

$$\bar{x}_{log}(t+T) = k\bar{x}_{log}(t) + (1-k)x_{log}(t) \quad (11)$$

$$\alpha(t) = \frac{10^{\left(\frac{\bar{x}_{log}(t)}{10}\right)}}{x_{nominal}}. \quad (12)$$

Above x(t) is a measured power quantity in the linear domain, $x_{log}(t)$ is the corresponding value in the logarithmic domain, $\bar{x}_{log}(t)$ is the logarithmic mean power value of the recursive filter at time t and $t_{nominal}$ is the nominal value of the power level (used for tuning) in the linear domain.

Finally, note that the covariances, according to the invention, typically scale like $\alpha^2$. The values needed in the distributions are normally the standard deviations that then scale like $|\alpha|$.

Figure 8:
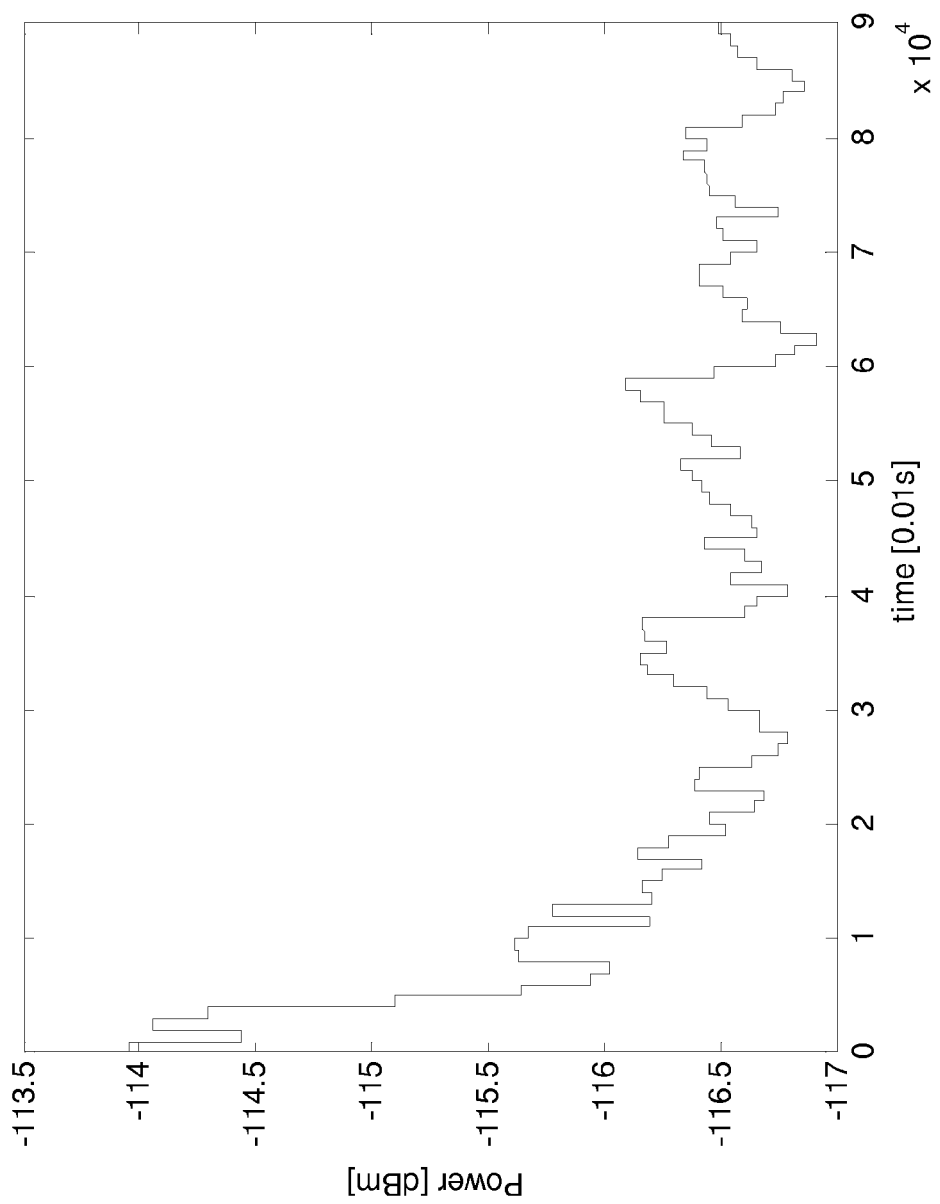
FIG. 8 illustrates the estimated noise power floor of a known method.
Figure 9:
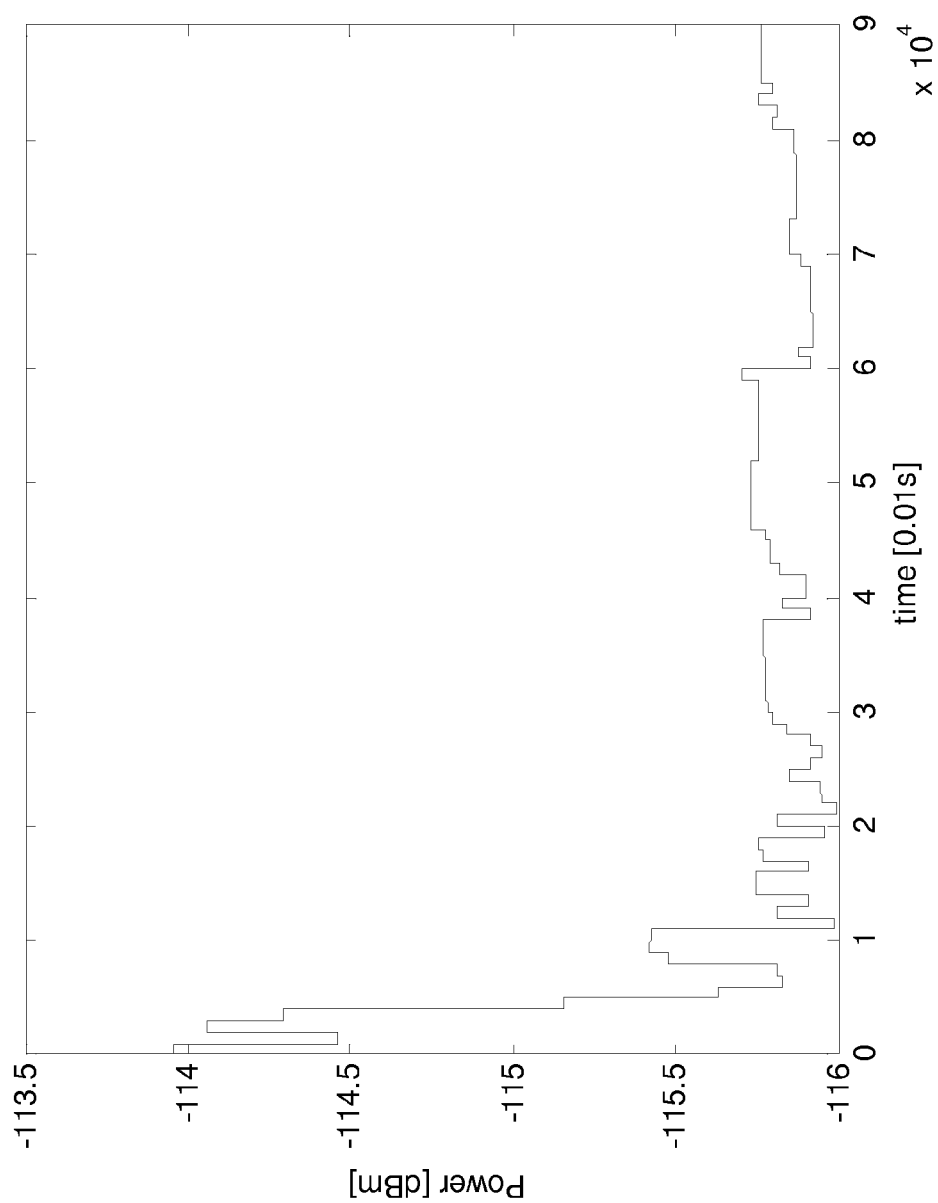
FIG. 9 illustrates the estimated noise power floor according to the present invention.

To further illustrate the advantages of the present invention, a few numerical examples in the form of comparative simulations will be described in the following, with reference to FIG. 7-FIG. 9. The numerical examples below illustrate:

The reduced accuracy without the present invention: and

The correction that restores the accuracy, said correction being obtained with the present invention.

A simulation was performed with a known algorithm, with and without the embodiments of the scaling of the present invention. FIG. 7 illustrates the measured total received wideband power (RTWP), FIG. 8 illustrates the estimated noise power floor without the present invention, while FIG. 9 illustrates the estimated noise power floor based on the present invention.

Figure 7:
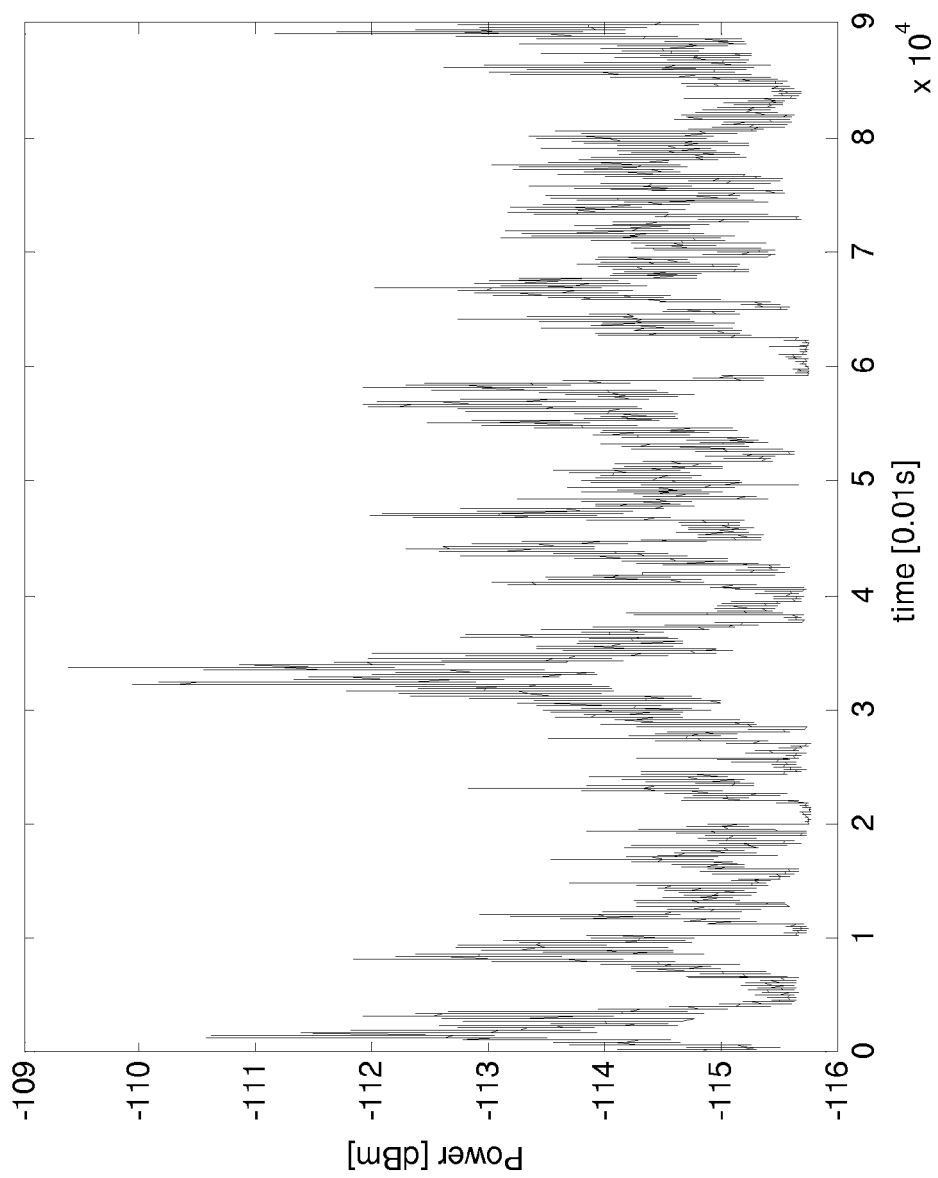
FIG. 7 illustrates the measured RTWP vs. time.

It can be seen from FIG. 7 that the true noise power level is about −116.0 dBm, while the algorithm is tuned for a nominal level of −104 dBm. The algorithm without scaling delivers a noise floor about 1 dB too low, as compared to the algorithm with scaling that is almost on target.

It should be noted that a 1 dB error means that an equivalent margin needs to be introduced e.g. in the admission control or enhanced uplink functions. This directly translates to a corresponding capacity loss (in this case about 5 voice calls).

Figure 10:
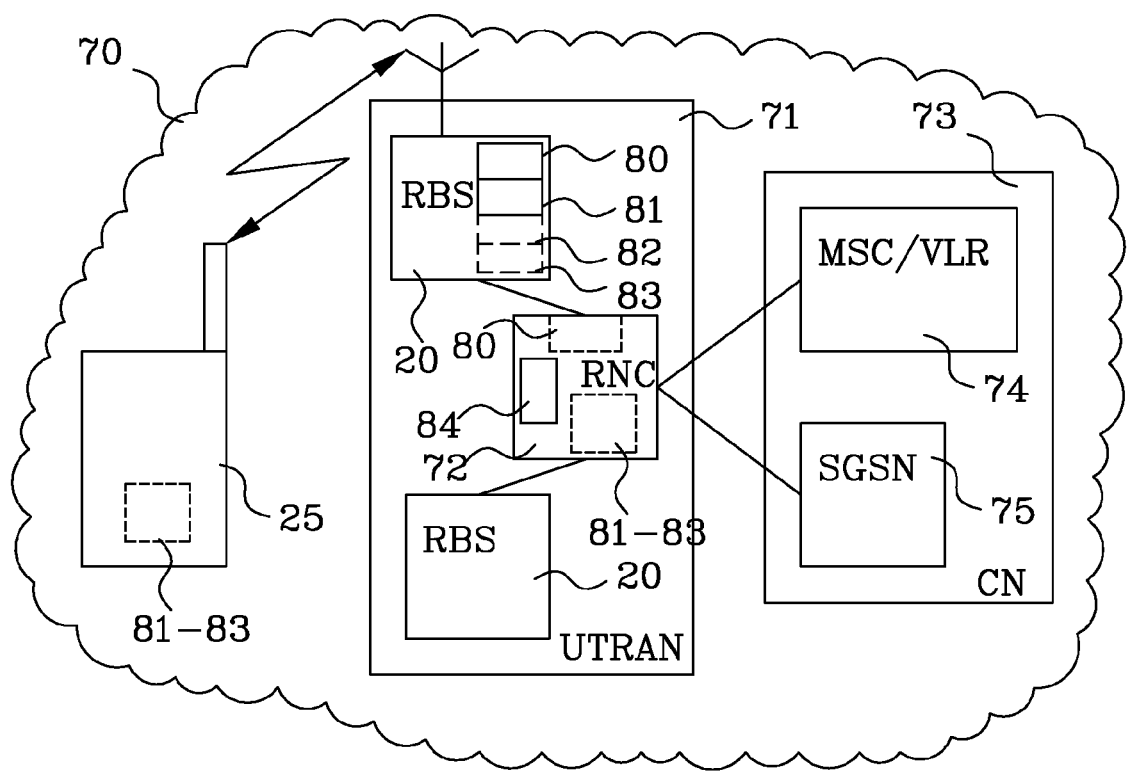
FIG. 10 is a schematic illustration of an embodiment of a system according to the invention.

FIG. 10 illustrates main parts of an embodiment of a system according to the present invention. A wireless communications system 70 comprises a Universal mobile telecommunication system Terrestrial Radio Access Network (UTRAN) 71. A mobile terminal 25 is in radio contact with a RBS 20 in the UTRAN 71. The RBS 20 is controlled by a Radio Network Controller (RNC) 72, which in turn is connected to a Mobile services Switching Centre/Visitor Location Register (MSC/VLR) 74 and a Serving General packet radio system Support Node (SGSN) 75 of a core network CN 73.

In this embodiment, the RBS 20 comprises means for obtaining measurements 80 of samples of at least the received total wideband power, means for estimating 81 a probability distribution of a first power quantity based on the measured total wideband power. The RBS 20 further comprises means for estimating 82 a mean power level for the first power quantity, and means for adapting 83 a width of the estimated probability distribution, to enable a subsequent calculation of a probability density function of a noise floor measure that is discretized on a grid.

In addition, and according to an alternative embodiment, the system further comprises an estimator unit for estimating or determining a scaling parameter $\alpha(t)$ to be supplied as an input parameter to the adaptation unit 83.

The different means 80-83 can according to further embodiments be located within the RBS 20, as discussed above, or the RNC 72 or a mobile or user terminal 25. In the latter case, the invention concerns downlink noise floor estimation. This is indicated by the dashed boxes in the RNC 72 and the user terminal 25.

In addition to the above described features, the RNC 22 can according to known measures comprise means 84 for admission control. The means 84 for admission control comprises preferably functionality for enhanced uplink control, and is connected to the RBS 20 for information exchange, in particular concerning noise rise estimates.

Advantages of the present invention comprise

A significantly enhanced accuracy of the thermal noise power floor estimation step of soft noise rise estimation algorithms. Note that the invention applies to any present or future soft noise rise estimation algorithms, including:

The first described general algorithm.
The sliding window algorithm
The recursive algorithm
Any future algorithm whose dynamic Kalman filter estimation part is based on the model of Equations (1)-(2).

A computational complexity that does not grow in cases where the nominal mean power level is underestimated.

The embodiments described above are to be understood as a few illustrative examples of the present invention. It will be understood by those skilled in the art that various modifications, combinations, and changes may be made to the embodiments without departing from the scope of the present invention. In particular, different part solutions in the different embodiments can be combined in other configurations, where technically possible. However, the scope of the present invention is defined by the appended claims.

REFERENCES

[1] H. Holma and A. Toskala, WCDMA for UMTS—Radio Access for Third Generation Mobile Communications. Chichester, UK: Wiley, 2000.

[2] T. Söderström, Discrete Time Stochastic Systems. London, UK: Springer. 2002, pp. 12-14, 123-126, 142, 149-150, 247.

The invention claimed is:

1. A method in a node of a code division multiple access wireless communication system for improved soft noise power floor estimation, said method comprising the steps of:
measuring samples of at least received total wideband power;
estimating a probability distribution for a first power quantity from at least said measured received total wideband power;
estimating a mean power level for said first power quantity; and,
adapting a width of said probability distribution based at least on said estimated mean power level to enable computation of a probability density function of a noise floor measure that is discretized on a grid.

2. The method according to claim 1, wherein said grid is a power grid.

3. The method according to claim 1, wherein said grid is logarithmic.

4. The method according to claim 1, wherein said step of adapting provides a width of said probability distribution of first power quantity that follows the discretization density of said grid.

5. The method according to claim 1, wherein said step of adapting comprises the further step of determining a scaling parameter a(t) based on said estimated mean power level.

6. The method according to claim 5, wherein said step of adapting comprises scaling at least one covariance for said first power quantity based on said scaling parameter.

7. The method according to claim 6, wherein said at least one covariance is an estimated covariance.

8. The method according to claim 6, wherein said at least one covariance comprises an assumed measurement noise covariance and a system noise covariance.

9. The method according to claim 8, wherein both said covariances are scaled with the same scaling parameter.

10. The method according to claim 5, wherein said step of adapting comprises scaling a pre-computed covariance, said scaling is based on said scaling parameter.

11. The method according to claim 5, wherein said scaling is performed based on said scaling parameter squared $\alpha^2(t)$.

12. The method according to claim 5, wherein said scaling parameter is determined by means of averaging over a sliding window.

13. The method according to claim 6, wherein said scaling parameter $\alpha(t)$ is determined according to:

$$x_{log}(t) = 10\log^{10}(x(t))$$

$$\bar{x}_{log}(t+T) = k\bar{x}_{log}(t) + (1-k)x_{log}(t)$$

$$\alpha(t) = \frac{10^{\left(\frac{\bar{x}_{log}(t)}{10}\right)}}{x_{nominal}}$$

where $x(t)$ is a measured power quantity in the linear domain, $x_{log}(t)$ is a corresponding value in the logarithmic domain, $\bar{x}_{log}(t)$ is the logarithmic mean power value at time t and $x_{nominal}$ is the nominal value of the power level in the linear domain.

14. The method according to claim 6, wherein said scaling of said at least one covariance is performed according to:

$$R_1^\alpha(t) = \alpha^2(t)R_1(t)$$

$$R_2^\alpha(t) = \alpha^2(t)R_2(t)$$

where $R_1^\alpha(t)$ is the scaled system noise covariance matrix $R_1(t)$, $R_2^\alpha(t)$ is the scaled measurement covariance matrix $R_2(t)$, and $\alpha^2(t)$ is the squared scaling parameter.

15. The method according to claim 7, wherein said scaling is performed according to:

$$P^\alpha(t|t) = \alpha^2(t)P(\infty|\infty)$$

where $P^\alpha(t|t)$ is the scaled pre-computed covariance matrix, $\alpha^2(t)$ is the squared scaling parameter, and $P(\infty|\infty)$ is the pre-computed covariance matrix.

16. The method according to claim 1, wherein said width of said probability distribution is the Full Width at Half Maximum of a Gaussian distribution.

17. A node in a code division multiple access wireless communication system, said node comprising:
   means for measuring samples of at least received total wideband power;
   means for estimating a probability distribution for a first power quantity from at least said measured received total wideband power;
   means for estimating a mean power level for said first power quantity; and,
   means for adapting a width of said probability distribution based at least on said estimated mean power level, to enable computation of a probability density function of a noise floor measure that is discretized on a grid.

18. The node according to claim 17, wherein said grid is a power grid.

19. The node according to claim 17, wherein said grid is logarithmic.

20. The node according to claim 17, wherein said means for adapting are operative to provide a width of said probability distribution of first power quantity that follows the discretization density of said grid.

21. The node according to claim 17, wherein said means for adapting are further operative to determine a scaling parameter a(t) based on said estimated mean power level.

22. The node according to claim 21, wherein said means for adapting are arranged to scale at least one covariance for said first power quantity based on said scaling parameter.

23. The node according to claim 22, wherein said at least one covariance is an estimated covariance.

24. The node according to claim 22, wherein said at least one covariance comprises an assumed measurement noise covariance and a system noise covariance.

25. The node according to claim 24, wherein both said covariances are scaled with the same scaling parameter.

26. The node according to claim 21, wherein said adaptation means are arranged to scale a pre-computed covariance, said scaling is based on said scaling parameter.

27. The node according to claim 21, wherein said scaling is performed based on said scaling parameter squared $a^2(t)$.

28. The node according to claim 21, wherein said scaling parameter is determined by means of averaging over a sliding window.

29. The node according to claim 17, wherein said node is a mobile terminal.

30. The node according to claim 17, wherein said system is a WCDMA system.

31. The node according to claim 22, wherein said scaling parameter $\alpha(t)$ is determined according to:

$$x_{log}(t) = 10\log^{10}(x(t))$$

$$\bar{x}_{log}(t+T) = k\bar{x}_{log}(t) + (1-k)x_{log}(t)$$

$$\alpha(t) = \frac{10^{\left(\frac{\bar{x}_{log}(t)}{10}\right)}}{x_{nominal}}$$

where x(t) is a measured power quantity in the linear domain, $x_{log}(t)$ is a corresponding value in the logarithmic domain, $\bar{x}_{log}(t)$ is the logarithmic mean power value at time t and $x_{nominal}$ is the nominal value of the power level in the linear domain.

32. The node according to claim 22, wherein said scaling of said at least one covariance is performed according to:

$$R_1^\alpha(t) = \alpha^2(t)R_1(t)$$

$$R_2^\alpha(t) = \alpha^2(t)R_2(t)$$

where $R_1^\alpha(t)$ is the scaled system noise covariance matrix $R_1(t)$, $R_2^\alpha(t)$ is the scaled measurement covariance matrix $R_2(t)$, and $\alpha^2(t)$ is the squared scaling parameter.

33. The node according to claim 23, wherein said scaling is performed according to:

$$P^\alpha(t|t) = \alpha^2(t)P(\infty|\infty)$$

where $P^\alpha(t|t)$ is the scaled pre-computed covariance matrix, $\alpha^2(t)$ is the squared scaling parameter, and $P(\infty|\infty)$ is the pre-computed covariance matrix.

* * * * *